United States Patent
Chung et al.

(10) Patent No.: US 9,310,602 B1
(45) Date of Patent: Apr. 12, 2016

(54) COLOR ELECTROWETTING DISPLAY HAVING HIGH RESOLUTION MONOCHROME MODE

(71) Applicant: Amazon Technologies, Inc., Reno, NV (US)

(72) Inventors: Jerry Yee-Ming Chung, Los Altos, CA (US); Siddharth Gupta, San Bruno, CA (US); Bokke Johannes Feenstra, Nuenen (NL)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 14/229,488

(22) Filed: Mar. 28, 2014

(51) Int. Cl.
| | |
|---|---|
| G02B 26/00 | (2006.01) |
| G02B 26/02 | (2006.01) |
| G09G 5/00 | (2006.01) |
| G09G 3/34 | (2006.01) |
| G09G 3/20 | (2006.01) |

(52) U.S. Cl.
CPC ............ G02B 26/005 (2013.01); G02B 26/004 (2013.01); G09G 3/348 (2013.01); G02B 2207/115 (2013.01); G09G 3/2003 (2013.01); G09G 5/00 (2013.01)

(58) Field of Classification Search
CPC .... G02B 26/00; G02B 26/002; G02B 26/004; G02B 26/005; G02B 26/02; G02B 2207/115; G09G 3/34; G09G 3/3433; G09G 3/348; G09G 3/2003; G09G 5/00; G09G 2300/0439; G09G 2300/0452; G09G 2300/0809; G09G 2310/0289; G09G 2320/00
USPC ................. 359/290–295, 298, 228, 245, 253; 345/49, 212; 427/58, 66, 558
See application file for complete search history.

(56) References Cited

U.S. PATENT DOCUMENTS

| | | | |
|---|---|---|---|
| 8,350,783 B2* | 1/2013 | Feenstra et al. ................ 345/60 |
| 8,508,436 B2* | 8/2013 | Jessop ............................. 345/49 |
| 8,854,718 B2* | 10/2014 | Jung et al. ..................... 359/290 |
| 8,896,903 B2* | 11/2014 | Vermeulen et al. ........... 359/290 |
| 9,019,589 B2* | 4/2015 | Novoselov et al. ........... 359/290 |

\* cited by examiner

*Primary Examiner* — Loha Ben
(74) *Attorney, Agent, or Firm* — Lee & Hayes, PLLC (57) ABSTRACT

The subject matter disclosed herein relates to an electrowetting display comprising pixels that include colored subpixels that comprise: a colored reflective layer on a support plate; an electrode; a hydrophobic layer; and a liquid region including an electrolyte, and dark electrowetting oil and white electrowetting oil both being immiscible with the electrolyte. A coverage area of the dark electrowetting oil on the hydrophobic layer and a coverage area of the white electrowetting oil on the hydrophobic layer are individually electronically adjustable to affect light transmission to the colored reflective material.

21 Claims, 8 Drawing Sheets

ADJUST VOLTAGE AND/OR FREQUENCY OF A FIRST ELECTRONIC SIGNAL PROVIDED TO A FIRST ELECTRODE ADJACENT TO A HYDROPHOBIC LAYER THAT OVERLIES A COLORED REFLECTIVE LAYER TO VARY WETTABILITY OF A DARK LIQUID ON THE HYDROPHOBIC LAYER, WHEREIN AN AMOUNT OF LIGHT RECEIVED AT THE COLORED REFLECTIVE LAYER DEPENDS, AT LEAST PARTIALLY, ON THE WETTABILITY OF THE DARK LIQUID
1102

▼

ADJUST VOLTAGE AND/OR FREQUENCY OF A SECOND ELECTRONIC SIGNAL PROVIDED TO A SECOND ELECTRODE ADJACENT TO THE HYDROPHOBIC LAYER TO VARY WETTABILITY OF A WHITE LIQUID ON THE HYDROPHOBIC LAYER, WHEREIN AN AMOUNT OF LIGHT RECEIVED AT THE COLORED REFLECTIVE LAYER DEPENDS, AT LEAST PARTIALLY, ON THE WETTABILITY OF THE WHITE LIQUID
1104

COLOR ELECTROWETTING DISPLAY HAVING HIGH RESOLUTION MONOCHROME MODE

BACKGROUND

Modern communication devices typically have user interfaces that include high-quality displays (e.g., color, greater than 300 pixels per inch (ppi), 800:1 contrast ratio, and so on). Increased multimedia use imposes high demands on designs of display modules incorporated in these devices. An electrowetting display meets demands of such modern devices and performs well in high ambient light conditions (e.g., in sunlight), has relatively fast video speed, and relatively low power consumption. Accordingly, an electrowetting display can replace a liquid crystal display (LCD) in a number of devices such as mobile phones, handheld computing devices, cameras, and so on.

An electrowetting display includes an array of pixels individually bordered by pixel walls that retain liquid, such as opaque oil, for example. Light transmission through each pixel is adjustable by electronically controlling a position of the liquid in the pixel. Resolution and quality of an electrowetting display can depend on a number of factors, such as optical transmissivity or reflectivity of material layers of the electrowetting display and pixel size, just to name a few examples.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Overview

Electrowetting displays include an array of pixels that individually employ an applied voltage to change the surface tension of one or more liquids in relation to a surface. For instance, by applying a voltage to a hydrophobic surface, wetting properties of the surface can be modified so that the surface becomes increasingly hydrophilic. Such pixels are sandwiched between two support plates which, for example, may include glass or polymer substrates and may be made of a rigid or flexible material. Individual pixels are surrounded by pixel walls made, for instance, from photoresist material. Pixel walls retain a first liquid which is electrically non-conductive, such as opaque or colored oil in the individual pixels. In some embodiments, a second liquid, such as opaque or colored oil having a color different from that of the first liquid, may also be in the individual pixels. A cavity formed between the support plates comprises the first liquid and the second liquid. The cavity is also comprises a third liquid comprising an electrolyte that is electrically conductive or polar. For example, the third liquid may be water or a salt solution such as potassium chloride water. The third liquid may be transparent, but may be colored, white, absorbing or reflecting. The third liquid is immiscible with the first liquid and with the second liquid. Herein, substances are immiscible with one another if the substances do not substantially form a solution.

Hereinafter, example embodiments include reflective electrowetting displays that include a clear top support plate and a bottom support plate, which need not be transparent. The clear top support plate may comprise glass or any of a number of transparent materials, such as plastic, quartz, semiconductors, and so on, and claimed subject matter is not limited in this respect. "Top" and "bottom", as used herein to identify the support plates of an electrowetting display, do not necessarily refer to a direction referenced to gravity or to a viewing side of the electrowetting display. Also, as used herein for sake of convenience of describing example embodiments, the top support plate is that through which viewing of pixels of a (reflective) electrowetting display occurs.

In some embodiments, a reflective electrowetting display comprises an array of pixels sandwiched between a bottom support plate and a top support plate. The bottom support plate can be opaque while the top support plate is transparent. Herein, describing an element or material as being "transparent" means that the element or material can transmit a relatively large fraction of the light incident upon it. For example, a transparent substrate or layer may transmit more than 70% or 80% of the light impinging on its surface, though claimed subject matter is not limited in this respect.

Each of the array of pixels in a reflective electrowetting display can include color subpixels, such as red (R), green (G), and blue (B) subpixels. A set of such subpixels can be referred to as RGB subpixels. Herein, unless otherwise specified, a pixel includes color subpixels (e.g., RGB subpixels). Each of such subpixels includes a color reflective layer on the bottom support plate of the electrowetting display, a transparent electrode on the color reflective layer, and a hydrophobic layer on the electrode. Pixel walls of each subpixel, the hydrophobic layer, and the transparent top support plate at least partially enclose a liquid region that includes an electrolyte, a dark liquid and a white liquid. Both the dark liquid and the white liquid are immiscible with the electrolyte. Herein, "dark" is used to describe a liquid that appears black to an observer. For example, a dark liquid strongly absorbs a broad spectrum of wavelengths (e.g., including those of red, green and blue) in the visible region of electromagnetic radiation. On the other hand, "white" is used to describe a liquid that appears white to an observer. For example, a white liquid strongly reflects a broad spectrum of wavelengths (e.g., including those of red, green and blue) in the visible region of electromagnetic radiation. In some implementations, the dark liquid and the white liquid are each nonpolar electrowetting oils.

The dark liquid is disposed in a first portion of the liquid region while the white liquid is disposed in a second portion of the liquid region. As described in detail below, coverage area of the dark liquid on the bottom hydrophobic layer and coverage area of the white liquid on the bottom hydrophobic layer are electronically adjustable to affect the amount of light incident on the reflective electrowetting display that reaches the color reflective material at the bottom of each subpixel.

In some embodiments, an electrowetting display as described herein can comprise a portion of a system that includes one or more processors and one or more computer memories. Display software can be stored on the one or more memories and can be operable with the one or more processors to modulate light that is out-coupled from a light guide of the electrowetting display. For example, display software can include code executable by a processor to modulate optical properties of individual pixels of the electrowetting display based, at least in part, on electronic signals representative of image or video data. The code can cause the processor to modulate the optical properties of pixels by controlling electrical signals (e.g., voltages, currents, fields, and so on) on, over, or in layers of the electrowetting display.

Illustrative Structures and Processes

Figure 1:
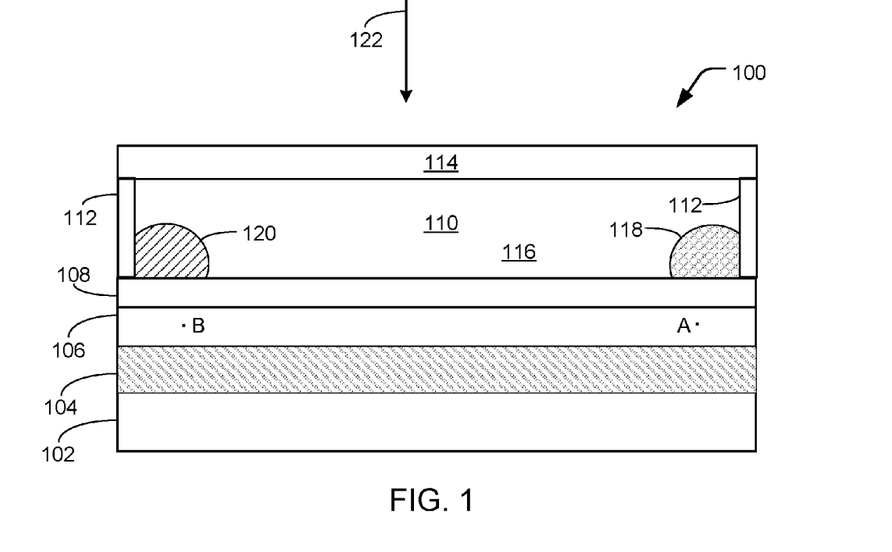
FIGS. 1-5 are cross-section views of a portion of an electrowetting display including two color liquids in various configuration states, according to some embodiments.

FIG. 1 is a cross-section view showing a subpixel 100 of an electrowetting display, according to some embodiments. Subpixel 100 may be one of several subpixels that collectively comprise a color pixel. For example, subpixel 100 may be any of a red, green or blue subpixel of a color pixel of an electrowetting display. Other color subpixels (e.g., RGB, and/or white) may also be present in a pixel, and claimed subject matter is not limited in this respect.

Subpixel 100 includes a support plate 102, a color reflective layer 104 on support plate 102, an electrode layer 106 on color reflective layer 104, a hydrophobic layer 108 on electrode layer 106, and a liquid region 110. In some implementations, color reflective layer 104 can be a corrugated reflector, a light scattering optical film, or a combined color filter and reflector, just to name a few examples. In some implementations, hydrophobic layer 108 can be a fluoropolymer, such as AF1600, produced by DuPont, based in Wilmington, Del.

In some embodiments, liquid region 110 is at least partially surrounded by pixel walls 112, hydrophobic layer 108 and a transparent top support plate 114. Pixel walls 112 may partition adjacent subpixels from one another. In some embodiments, pixel walls 112 may not extend entirely between the lower and the upper support plates. In this case, the third liquid 116 is shared between two or more neighboring pixels. In some particular implementations, liquid region 110 includes an electrolyte 116, a dark electrowetting oil 118 and a white electrowetting oil 120. Electrolyte 116 may be any of a number of electrically conductive liquids such as, for example, a solution of ethylene glycol and glycerol. Dark electrowetting oil 118 and white electrowetting oil 120 are each immiscible with electrolyte 116. In FIG. 1 and descriptions of other example embodiments herein, dark electrowetting oil 118 is shown to be disposed in a right-hand portion of liquid region 110 while white electrowetting oil 120 is shown to be disposed in a left-hand portion of liquid region 110. Claimed subject matter is not limited in this respect, and positions of the dark electrowetting oil and the white electrowetting oil may be switched, for example.

Electrode layer 106 can include any number of electrodes so that one or more electrical potentials can be applied at different regions along electrode layer 106. For example, a first electrical potential can be applied in a region at or near point A, close to dark electrowetting oil 118, and a second electrical potential can be applied in a region at or near point B, close to white electrowetting oil 120. Magnitude and/or frequency of each of the first electrical potential and the second electrical potential can be independently adjusted to affect behavior of dark electrowetting oil 118 and white electrowetting oil 120. In particular, electrical potential applied via electrodes of electrode layer 106 affects how strongly hydrophobic the hydrophobic layer 108 is to electrolyte 116. Hydrophobicity in turn affects wettability. The terms "hydrophobic" and "hydrophilic" can correspond to describing how wettable a material is with respect to another material. Accordingly, unless otherwise specified herein, terms such as "wettability", "more wettable" or "less wettable" are used. Also herein, the term "hydrophobicity" refers to how hydrophobic or how wettable a material is. For example, hydrophobic layer 108 can be made to be hydrophilic, or more wettable, to electrolyte 116 by applying an electrical potential to electrode layer 106. On the other hand, hydrophobic layer 108 remains hydrophobic, or less wettable, to electrolyte 116 by not applying an electrical potential to electrode layer 106. In general, when hydrophobic layer 108 is more wettable to electrolyte 116, dark electrowetting oil 118 and white electrowetting oil 120 are displaced by the electrolyte to the sides of liquid region 110 (e.g., as shown in FIG. 1). In contrast, when hydrophobic layer 108 is less wettable to electrolyte 116, dark electrowetting oil 118 and white electrowetting oil 120 can spread on hydrophobic layer 108, since the electrolyte is repelled from the hydrophobic layer.

Whether dark electrowetting oil 118 and/or white electrowetting oil 120 are displaced to the sides of liquid region 110 or spread over hydrophobic layer 108 can determine whether subpixel 100 renders white, black, gray or a color (of the subpixel). For example, whether dark electrowetting oil 118 and/or white electrowetting oil 120 are displaced to the sides of liquid region 110 or spread over hydrophobic layer 108 can determine the amount of light incident on subpixel 100 (via transparent top support plate 114) that reaches color reflective layer 104. To an observer of subpixel 100, the color intensity of the subpixel depends, at least in part, on the amount of light that reaches color reflective layer 104, and subsequently reflects back to the observer. For example, the range of color intensities of a red subpixel can include black, dark red, red, light red and white. The configuration shown in FIG. 1 renders a color subpixel because black electrowetting oil 118 and white electrowetting oil 120 (both being displaced to respective side portions of liquid region 110) do not block an observer looking in the direction shown by arrow 122 from seeing color reflective layer 104.

In another example, whether dark electrowetting oil 118 and/or white electrowetting oil 120 are displaced to the sides of liquid region 110 or spread over hydrophobic layer 108 can determine whether subpixel 100 reflects light (e.g., from white electrowetting oil) back to the observer to render white or whether subpixel 100 substantially absorbs light (e.g., into dark electrowetting oil) across the visible spectrum to render black. In this fashion, a subpixel can produce white or black over an area that is relatively small compared to the area necessary for an RGB color pixel to produce white or black. For example, white or black can be produced by subpixel 100 over an area corresponding to the single subpixel. Thus, compared to pixels that produce white or black using all RGB subpixels, monochromatic resolution (e.g., black and white) can be increased by particular placement of white liquid (e.g., 120) and dark liquid (e.g., 118) over individual RGB subpixels (e.g., over color reflective layer 104 of individual RGB colors).

Figure 2:
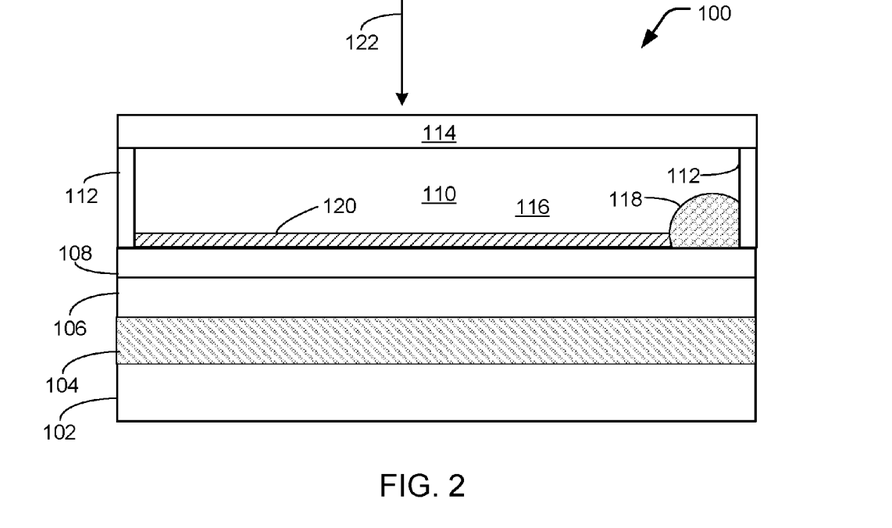

FIG. 2 is a cross-section view showing subpixel 100 having a particular configuration of dark electrowetting oil 118 and white electrowetting oil 120. Here, dark electrowetting oil 118 is displaced to a side portion of liquid region 110 by electrolyte 116 and/or white electrowetting oil 120, which is spread across hydrophobic layer 108. For example, whether electrolyte 116, white electrowetting oil 120, or both displace dark electrowetting oil 118 to the side portion of liquid region 110 depends, at least in part, on a particular process used to bring dark electrowetting oil 118 and white electrowetting oil 120 to the configuration shown in FIG. 2. In a first example method, initial conditions include dark electrowetting oil 118 and white electrowetting oil 120 both being displaced to respective side portions of liquid region 110 (e.g., such as that shown in FIG. 1) and hydrophobic layer 108 being more wettable to electrolyte 116 by an electrical potential applied via a portion of electrode layer 106. This method then proceeds with an adjustment of electrical potentials at various regions of electrode layer 106 (e.g., such as at or near points A and B) so that hydrophobic layer 108 first becomes less wettable to electrolyte 116 nearer to white electrowetting oil 120 than to dark electrowetting oil 118. In other words, the leftward region of hydrophobic layer 108 is adjusted (via electrical potentials applied at various regions of electrode layer 106) to be less wettable to electrolyte 116 as compared to how wettable the rightward region of hydrophobic layer 108 is to the electrolyte. In this fashion, the leftward region of hydrophobic layer 108 will repel electrolyte 116 before the rightward region has a chance to do so. Thus, white electrowetting oil 120 spreads across hydrophobic layer 108 before dark electrowetting oil 118 has a chance to do so. Consequent to white electrowetting oil 120 spreading across hydrophobic layer 108, dark electrowetting oil 118 is constrained by displacement of the white electrowetting oil. The resulting configuration shown in FIG. 2 renders a white subpixel because an observer looking in the direction shown by arrow 122 sees white electrowetting oil 120, which conceals color reflective layer 104 from the observer's view. It is worth noting that sizes or thicknesses of various elements, such as electrowetting oil, in the figures described herein may be exaggerated for clarity. For example, an electrowetting oil droplet will have a particular volume that does not change when the droplet is in the form of a flat, spread-out configuration. Thus, the volume of white electrowetting oil 120 shown in FIG. 1 is the same as the volume of white electrowetting oil 120 shown in FIG. 2.

In a second example method, if initial conditions include either dark electrowetting oil 118, white electrowetting oil 120, or both being spread across hydrophobic layer 108, then the second example method can begin by including adjusting electrical potentials at one or more regions of electrode layer 106 so that hydrophobic layer 108 becomes more wettable to electrolyte 116. As a result, both dark electrowetting oil 118 and white electrowetting oil 120 are displaced to respective side portions of liquid region 110 (e.g., such as that shown in FIG. 1). This situation is similar to initial conditions for the first example method described above. Thus, the first example method can begin with the initial conditions provided by the second example method.

Figure 3:
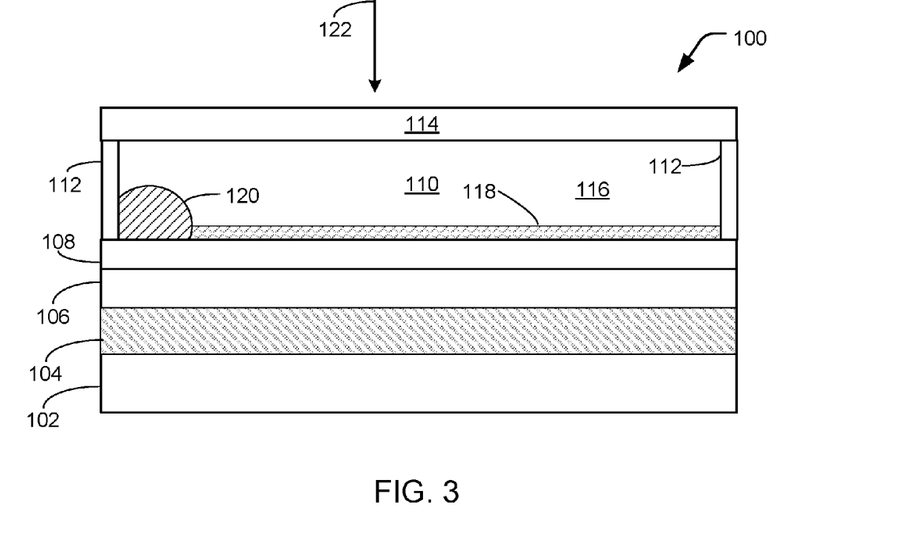

FIG. 3 is a cross-section view showing subpixel 100 having a particular configuration of dark electrowetting oil 118 and white electrowetting oil 120. Here, white electrowetting oil 120 is displaced to a side portion of liquid region 110 by electrolyte 116 and/or dark electrowetting oil 118, which is spread across hydrophobic layer 108. For example, whether electrolyte 116, dark electrowetting oil 120, or both displace white electrowetting oil 118 to the side portion of liquid region 110 depends, at least in part, on a particular method used to bring dark electrowetting oil 118 and white electrowetting oil 120 to the configuration shown in FIG. 2. Some of these methods are the same or are similar to the first and second example methods described above. The resulting configuration of dark electrowetting oil 118 and white electrowetting oil 120 shown in FIG. 3 renders a black subpixel because an observer looking in the direction shown by arrow 122 sees dark electrowetting oil 118, which appears black and conceals color reflective layer 104 from the observer's view.

Figure 4:
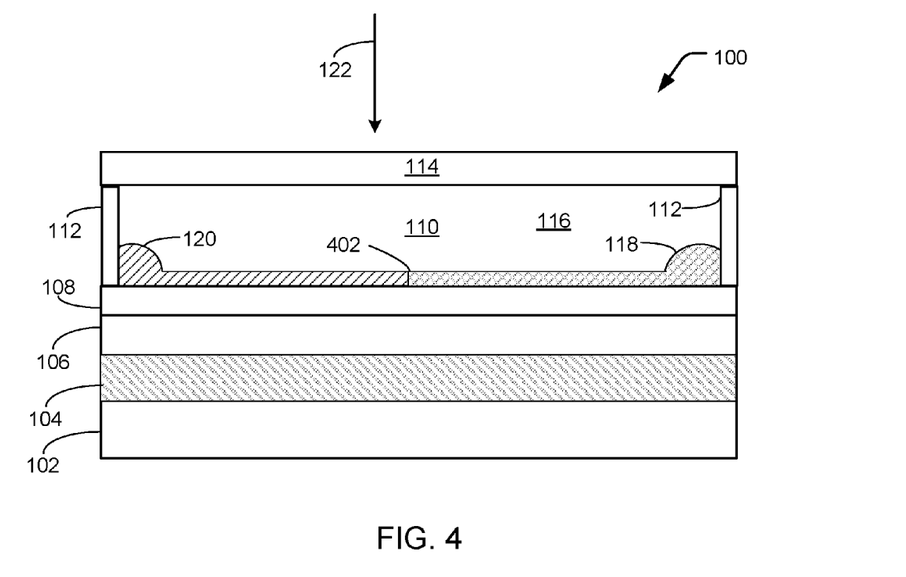

FIG. 4 is a cross-section view showing subpixel 100 having a particular configuration of dark electrowetting oil 118 and white electrowetting oil 120. Here, both dark electrowetting oil 118 and white electrowetting oil 120 are partially spread across hydrophobic layer 108. An example method used to bring dark electrowetting oil 118 and white electrowetting oil 120 to the configuration shown in FIG. 4 may begin with initial conditions including dark electrowetting oil 118 and white electrowetting oil 120 both being displaced to respective side portions of liquid region 110 (e.g., such as that shown in FIG. 1) and hydrophobic layer 108 being more wettable to electrolyte 116 by an electrical potential applied via a portion of electrode layer 106. This method then proceeds with an adjustment of electrical potentials at various regions of electrode layer 106 (e.g., such as at or near points A and B) so that hydrophobic layer 108 becomes less wettable to electrolyte 116 simultaneously across hydrophobic layer 108. In this fashion, both dark electrowetting oil 118 and white electrowetting oil 120 can begin to spread across hydrophobic layer 108 at the same time. Assuming dark electrowetting oil 118 and white electrowetting oil 120 spread at the same rate (e.g., to have the same surface tension), dark electrowetting oil 118 and white electrowetting oil 120 will meet at or near a halfway point 1002.

In some particular implementations, to account for any differences in surface tension of dark electrowetting oil 118 and white electrowetting oil 120, hydrophobic layer 108 can be adjusted to be less wettable to electrolyte 116 nearest to one side of hydrophobic layer 108 a short time before being adjusted to be less wettable to electrolyte 116 on the other side.

The resulting configuration shown in FIG. 4 renders a 50% gray subpixel because an observer looking in the direction shown by arrow 122 sees substantially equal amounts of dark electrowetting oil 118 and white electrowetting oil 120, which conceals color reflective layer 104 from the observer's view.

Figure 5:
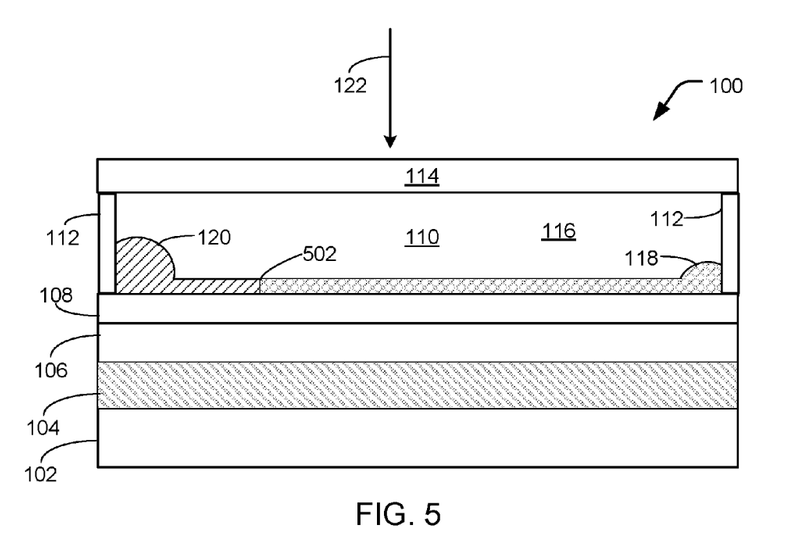

FIG. 5 is a cross-section view showing subpixel 100 having a particular configuration of dark electrowetting oil 118 and white electrowetting oil 120. Here, both dark electrowetting oil 118 and white electrowetting oil 120 are partially spread across hydrophobic layer 108. Compared to the configuration shown in FIG. 10, however, dark electrowetting oil 118 is spread across a greater portion of hydrophobic layer 108 as compared to white electrowetting oil 120.

An example method used to bring dark electrowetting oil 118 and white electrowetting oil 120 to the configuration shown in FIG. 5 may begin with initial conditions including dark electrowetting oil 118 and white electrowetting oil 120 both being displaced to respective side portions of liquid region 110 (e.g., such as that shown in FIG. 1) and hydrophobic layer 108 being more wettable to electrolyte 116 by an electrical potential applied via a portion of electrode layer 106. This method then proceeds with an adjustment of electrical potentials at various regions of electrode layer 106 (e.g., such as at or near points A and B) so that hydrophobic layer 108 first becomes less wettable to electrolyte 116 nearer to black electrowetting oil 118 than to white electrowetting oil 120. In other words, the rightward region of hydrophobic layer 108 is adjusted (via electrical potentials applied at various regions of electrode layer 106) to be less wettable to electrolyte 116 as compared to how wettable the leftward region of hydrophobic layer 108 is to the electrolyte. In this fashion, the rightward region of hydrophobic layer 108 will repel electrolyte 116 before the leftward region has a chance to do so. Thus, dark electrowetting oil 118 spreads across hydrophobic layer 108 before white electrowetting oil 120 has a chance to do so. Consequent to dark electrowetting oil 118 spreading across hydrophobic layer 108 before white electrowetting oil 120 has a chance to do so results in the white electrowetting oil being constrained by the dark electrowetting oil where the two meet at interface 1102. The resulting configuration shown in FIG. 5 renders an approximately 75% gray subpixel because an observer looking in the direction shown by arrow 122 sees more dark electrowetting oil 118 than white electrowetting oil 120. Both dark electrowetting oil 118 and white electrowetting oil 120 conceal color reflective layer 104 from the observer's view. The percent-gray value is adjustable from 0% gray (e.g., white) to 100% gray (e.g., black) by varying the relative amount of coverage of dark electrowetting oil 118 and white electrowetting oil 120. Accordingly, the time lag between when dark electrowetting oil 118 and white electrowetting oil 120 begin to spread from their respective positions on the sides of liquid region 110 can determine the degree of gray that is rendered by subpixel 100.

In some embodiments, various techniques may be used to control the amount of spread of dark electrowetting oil 118 with respect to white electrowetting oil 120, and vice versa. For example, and as mentioned above, a location at which electrical potentials are adjusted (e.g., such as at or near points A and B) can control initiation points of the behavior of electrowetting oil 118 and/or white electrowetting oil 120. In another example, size and/or shape of electrode layer 106, and whether electrode layer 106 includes two or more individual electrodes (in various locations), can also affect the behavior of dark electrowetting oil 118 and white electrowetting oil 120. In yet another example, the volume and/or thickness of electrowetting oil 118 and white electrowetting oil 120 can also affect their behavior. In still another example, the rate of change of electrical potentials on the (one or more) electrodes (e.g., of electrode layer 106) can also affect the behavior of dark electrowetting oil 118 and white electrowetting oil 120. In still further examples, the behavior of dark electrowetting oil 118 and white electrowetting oil 120 can be based, at least in part, on physical properties of dark electrowetting oil 118 and white electrowetting oil 120 (e.g., surface tension, density, and so on) and/or properties of pixel walls (e.g., pixel walls 112) adjacent to dark electrowetting oil 118 and white electrowetting oil 120, respectively.

Figure 6:
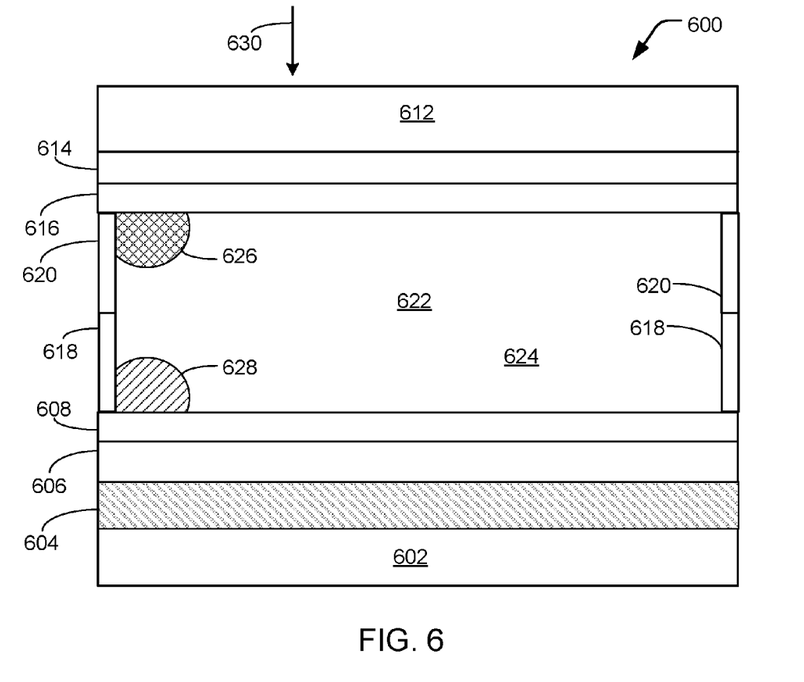
FIGS. 6-10 are cross-section views of a portion of an electrowetting display including two color liquids in various configuration states, according to other embodiments.

FIG. 6 is a cross-section view showing a subpixel 600 of an electrowetting display, according to some embodiments. Subpixel 600 may be one of several subpixels that collectively comprise a color pixel. For example, subpixel 600 may be any of a red, green or blue subpixel of a color pixel of an electrowetting display. Other color subpixels (e.g., RGB, and/or white) may also be present in a pixel, and claimed subject matter is not limited in this respect.

Subpixel 600 includes a bottom support plate 602, a color reflective layer 604 on support plate 602, a bottom electrode layer 606 on color reflective layer 604 and a bottom hydrophobic layer 608 on bottom electrode layer 606.

Subpixel 600 also includes a transparent top support plate 612, a top electrode layer 614 on top support plate 612 and a top hydrophobic layer 616 on top electrode layer 614.

In some embodiments, depending on a process of fabricating subpixel 600, the structure of bottom support plate 602 includes bottom pixel walls 618 and the structure of top support plate 612 includes top pixel walls 620. For example, the structure of bottom support plate 602 may be fabricated separately from the structure of top support plate 612. In such a fabricating process, the structure of bottom support plate 602 is joined to the structure of top support plate 612 at respective pixel walls 618 and 620 and spacers (not shown), for example. In other embodiments, pixel walls 618 and 620 may be a single structure fabricated at one time. For sake of descriptive convenience, pixel walls 618 and 620 are hereinafter referred to collectively as "1220". Pixel walls 620 may partition adjacent subpixels from one another.

A liquid region 622 is at least partially surrounded by pixel walls 620, bottom hydrophobic layer 608 and top hydrophobic layer 616. In some particular implementations, liquid region 622 includes an electrolyte 624, a dark electrowetting oil 626 and a white electrowetting oil 628. Electrolyte 624 may be any of a number of electrically conductive liquids such as, for example, a solution of ethylene glycol and glycerol. Dark electrowetting oil 626 and white electrowetting oil 628 are each immiscible with electrolyte 624. In FIG. 6 and descriptions of other example embodiments herein, dark electrowetting oil 626 is shown to be disposed on top hydrophobic layer 616 while white electrowetting oil 628 is shown to be disposed on bottom hydrophobic layer 608. Claimed subject matter is not limited in this respect, and positions of the dark electrowetting oil and the white electrowetting oil may be switched, for example.

Bottom electrode layer 606 and/or top electrode layer 614 can include electrode circuitry comprising transparent conductive material, such as indium tin oxide (ITO), for example. Magnitude and/or frequency of electrical potential of each of bottom electrode layer 606 and top electrode layer 614 can be independently adjusted to affect behavior of dark electrowetting oil 626 and white electrowetting oil 628. In particular, electrical potential applied via bottom electrode layer 606 affects how strongly hydrophobic the bottom hydrophobic layer 608 is to electrolyte 624, while electrical potential applied via top electrode layer 614 affects how strongly hydrophobic the top hydrophobic layer 616 is to electrolyte 624. For example, bottom hydrophobic layer 608 can be made to be more wettable to electrolyte 624 by applying an electrical potential to bottom electrode layer 606. On the other hand, bottom hydrophobic layer 608 can be made to be less wettable to electrolyte 624 by not applying an electrical potential to bottom electrode layer 606. Similarly, top hydrophobic layer 616 can be made to be more wettable to electrolyte 624 by applying an electrical potential to top electrode layer 614. On the other hand, top hydrophobic layer 616 can be made to be less wettable to electrolyte 624 by not applying an electrical potential to top electrode layer 614.

In general, when bottom hydrophobic layer 608 is more wettable to electrolyte 624, white electrowetting oil 628 is displaced by the electrolyte to the side of liquid region 622. In contrast, when bottom hydrophobic layer 608 is less wettable to electrolyte 624, white electrowetting oil 628 can spread on bottom hydrophobic layer 608, since the electrolyte is repelled from the bottom hydrophobic layer. Similarly, when top hydrophobic layer 616 is more wettable to electrolyte 624, dark electrowetting oil 626 is displaced by the electrolyte to the side of liquid region 622. In contrast, when top hydrophobic layer 616 is less wettable to electrolyte 624, dark electrowetting oil 626 can spread on top hydrophobic layer 616, since the electrolyte is repelled from the top hydrophobic layer. The configuration shown in FIG. 1 is where bottom hydrophobic layer 608 and top hydrophobic layer 616 are more wettable to electrolyte 624 so that white electrowetting oil 628 and dark electrowetting oil 626 are both displaced by the electrolyte to the sides of liquid region 622.

Whether dark electrowetting oil 626 and/or white electrowetting oil 628 are displaced to the sides of liquid region 622 or spread over respective top and bottom hydrophobic layers can determine whether subpixel 600 renders white, black, gray or a color (of the subpixel). For example, whether dark electrowetting oil 626 and/or white electrowetting oil 628 are displaced to the sides of liquid region 622 or spread over the respective hydrophobic layers can determine the amount of light incident on subpixel 600 (via transparent top support plate 612) that reaches color reflective layer 604. To an observer of subpixel 600, the color intensity of the subpixel depends, at least in part, on the amount of light that reaches color reflective layer 604, and subsequently reflects back to the observer. For example, the range of color intensities of a red subpixel can include black, dark red, red, light red and white. The configuration shown in FIG. 600 renders a color subpixel because black electrowetting oil 626 and white electrowetting oil 628 (both being displaced to respective side portions of liquid region 622) do not block an observer looking in the direction shown by arrow 630 from seeing color reflective layer 604.

In another example, whether dark electrowetting oil 626 and/or white electrowetting oil 628 are displaced to the sides of liquid region 622 or spread over their respective hydrophobic layers can determine whether subpixel 600 reflects light (e.g., from the white electrowetting oil) back to the observer to render white or whether subpixel 600 substantially absorbs light (e.g., into the dark electrowetting oil) across the visible spectrum to render black.

Figure 7:
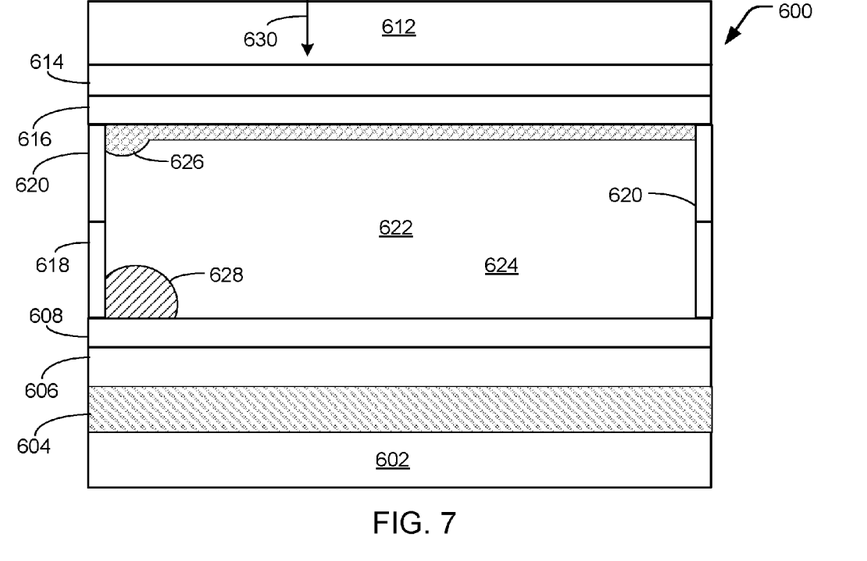

FIG. 7 is a cross-section view showing subpixel 600 having a particular configuration of dark electrowetting oil 626 and white electrowetting oil 628. Here, white electrowetting oil 628 is displaced to a side portion of liquid region 622 by electrolyte 624 while dark electrowetting oil 626 is spread across top hydrophobic layer 616. The resulting configuration shown in FIG. 7 renders a black subpixel because an observer looking in the direction shown by arrow 630 sees dark electrowetting oil 626, which conceals color reflective layer 604 from the observer's view.

Figure 8:
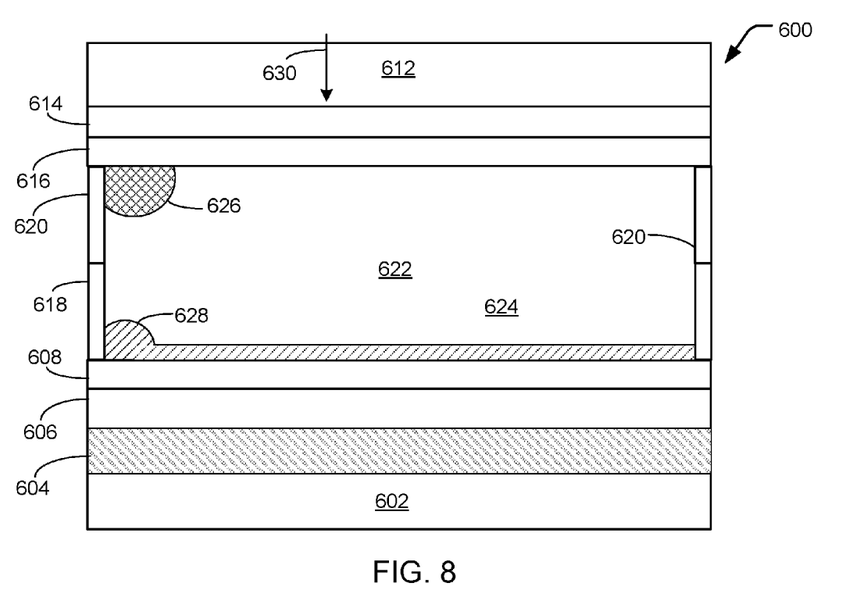

FIG. 8 is a cross-section view showing subpixel 600 having a particular configuration of dark electrowetting oil 626 and white electrowetting oil 628. Here, dark electrowetting oil 626 is displaced to a side portion of liquid region 622 by electrolyte 624 while white electrowetting oil 628 is spread across bottom hydrophobic layer 608. The resulting configuration shown in FIG. 8 renders a white subpixel because an observer looking in the direction shown by arrow 630 sees white electrowetting oil 628, which conceals color reflective layer 604 from the observer's view.

Figure 9:
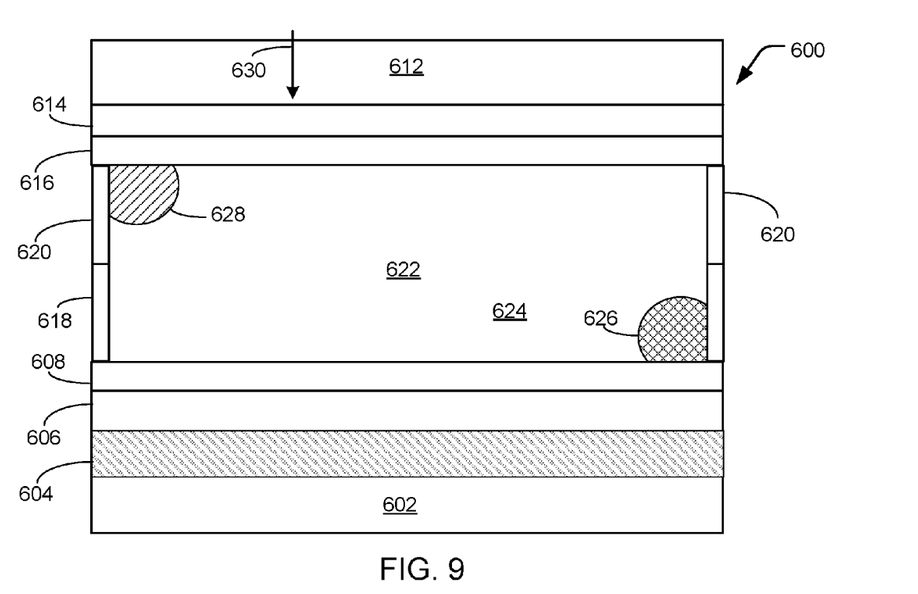

FIG. 9 is a cross-section view showing subpixel 600 having a particular configuration of dark electrowetting oil 628 and white electrowetting oil 626. Here, locations of white electrowetting oil 626 and dark electrowetting oil 626 are interchanged with one another, so that white electrowetting oil 626 is disposed on top hydrophobic layer 616 while dark electrowetting oil 626 is disposed on bottom hydrophobic layer 608. FIG. 9 also shows that white electrowetting oil 626 and dark electrowetting oil 626 can be displaced to any side of liquid region 622, and claimed subject matter is not limited in this respect.

Figure 10:
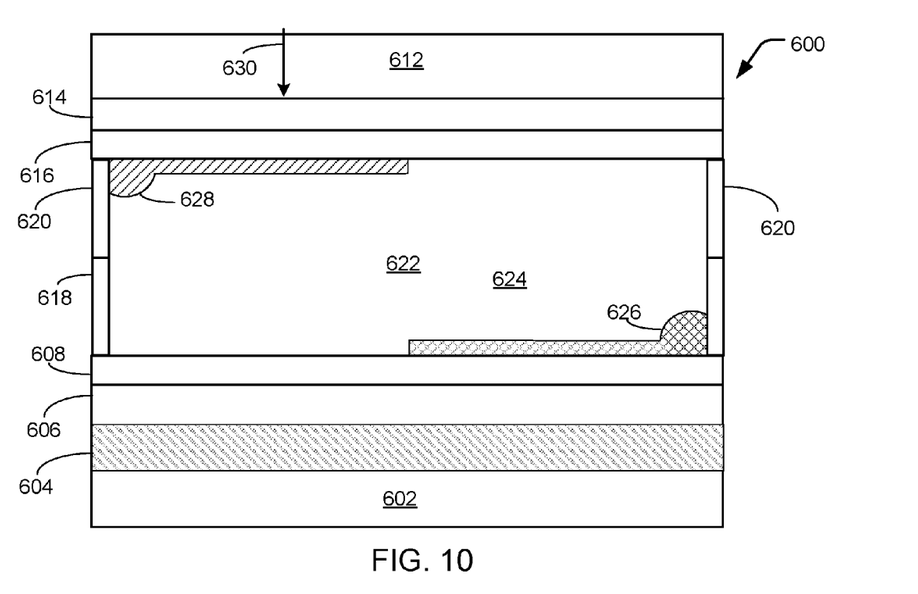

FIG. 10 is a cross-section view showing subpixel 600 having a particular configuration of dark electrowetting oil 626 and white electrowetting oil 628. Here, dark electrowetting oil 626 is spread partially across top hydrophobic layer 616 and white electrowetting oil 628 is spread partially across bottom hydrophobic layer 608. Frequency and/or magnitude of electrical potentials at bottom electrode layer 606 and top electrode layer 614 can be adjusted to achieve such partial spreading of dark electrowetting oil 626 and white electrowetting oil 628. The resulting configuration shown in FIG. 10 renders a 50% gray subpixel because an observer looking in the direction shown by arrow 630 sees substantially equal amounts of dark electrowetting oil 626 and white electrowetting oil 628, which conceals color reflective layer 604 from the observer's view. The percent-gray value is adjustable from 0% gray (e.g., white) to 100% gray (e.g., black) by varying the relative amount of coverage of dark electrowetting oil 626 and white electrowetting oil 628. Accordingly, the frequency and/or magnitude of electrical potentials respectively applied at bottom electrode layer 606 and top electrode layer 614 can determine the degree of gray that is rendered by subpixel 600.

Figure 11:
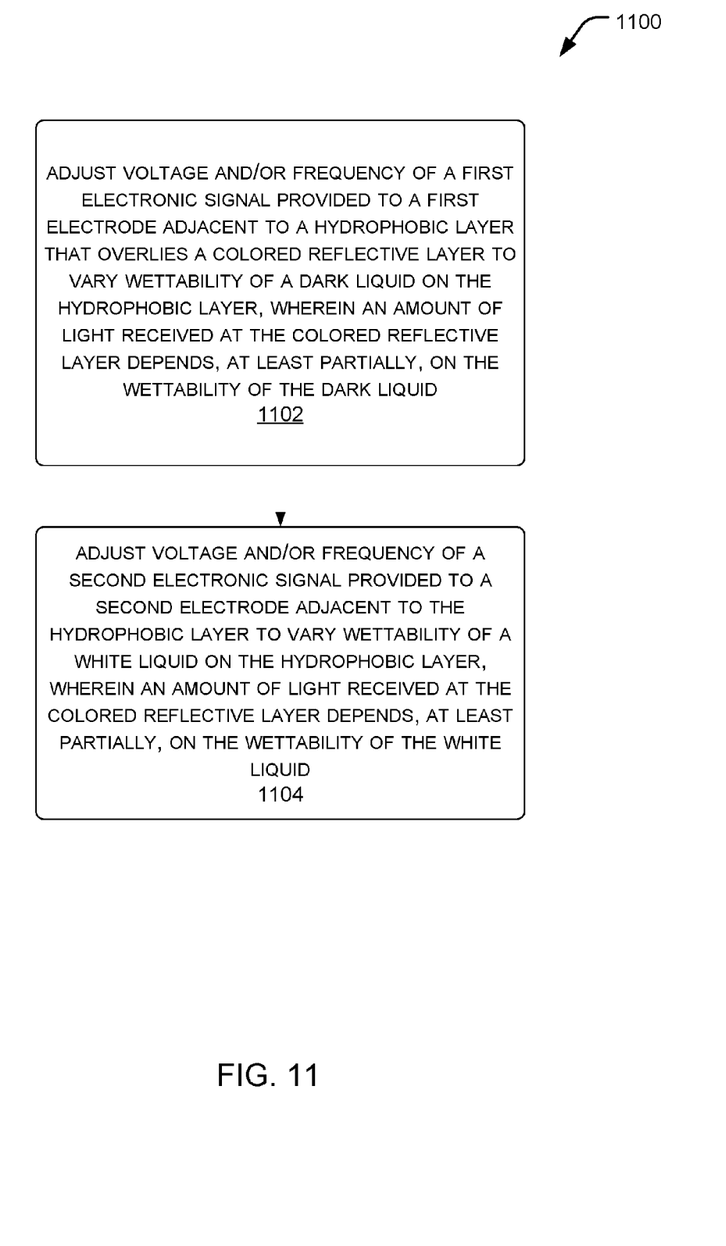
FIG. 11 illustrates a process of operating an electrowetting display, according to various embodiments.

FIG. 11 illustrates a process 1100 of operating a subpixel of a color pixel of an electrowetting display, according to various embodiments. For example, such a subpixel may be the same or similar to subpixels 100 or 600 shown in FIGS. 1-15. At block 1102, voltage and/or frequency of a first electronic signal provided to a first electrode adjacent to a hydrophobic layer that overlies a color reflective layer are adjusted to vary a coverage area of a dark liquid on the hydrophobic layer. The amount of light received at a color reflective layer (e.g., such as 104 or 604) depends, at least partially, on the coverage area of the dark liquid.

At block 1104, voltage and/or frequency of a second electronic signal provided to a second electrode adjacent to the hydrophobic layer are adjusted to vary a coverage area of a white liquid on the hydrophobic layer. The amount of light received at the color reflective layer depends, at least partially, on the coverage area of the white liquid. In some implementations, the color reflective layer is one of (i) a red reflective layer, (ii) a green reflective layer, or (iii) a blue reflective layer. As described above, the dark liquid and the white liquid may be immersed in an electrolyte and may each comprise non-polar electrowetting oils, though claimed subject matter is not limited in this respect.

Figure 12:
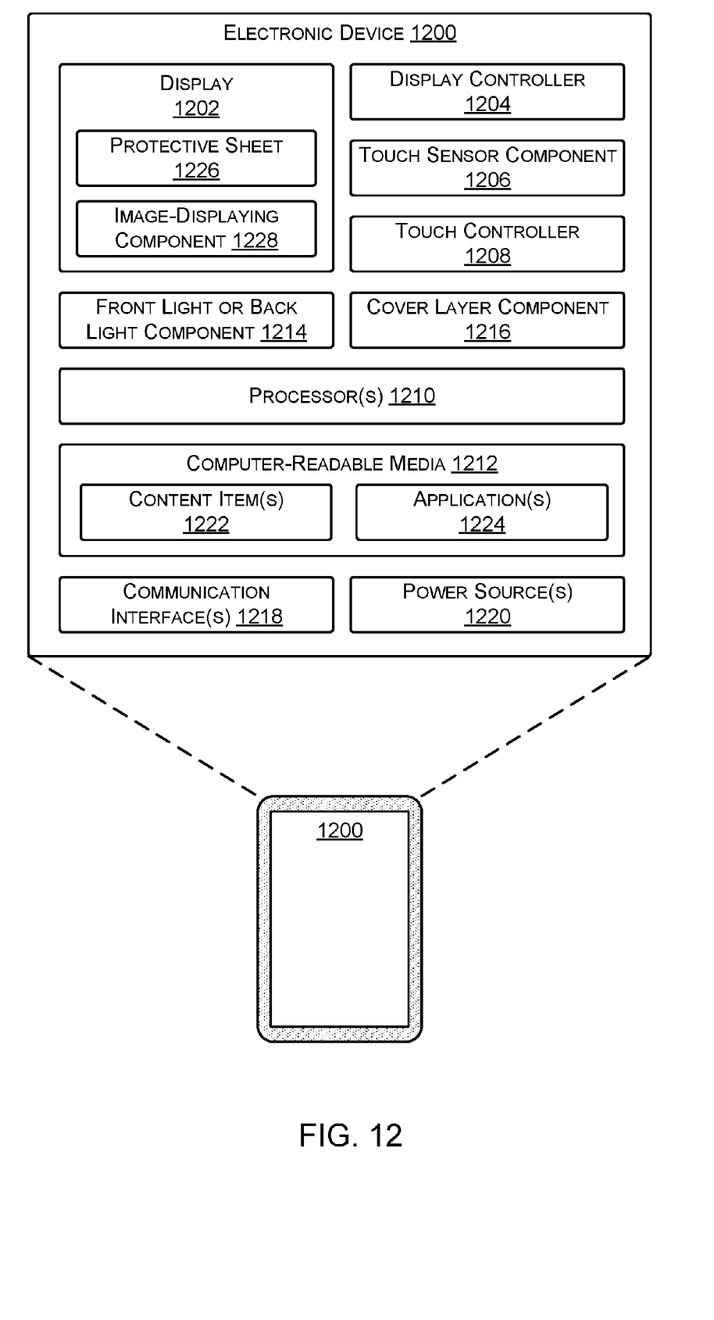
FIG. 12 illustrates an example electronic device equipped with a display device, according to some embodiments.

FIG. 12 illustrates an example electronic device 1200 that may incorporate display devices including subpixels 100 and 600 discussed above and illustrated in FIGS. 7-15, for example. Device 1200 may comprise any type of electronic device having a display. For instance, device 1200 may be a mobile electronic device (e.g., an electronic book reader, a tablet computing device, a laptop computer, a smart phone or other multifunction communication device, a portable digital assistant, a wearable computing device, an automotive display, etc.). Alternatively, device 1200 may be a non-mobile electronic device (e.g., a computer display, a television, etc.). In addition, while FIG. 12 illustrates several example components of electronic device 1200, it is to be appreciated that device 1200 may also include other conventional components, such as an operating system, system busses, input/output components, and the like. Further, in other examples, such as in the case of a television or computer monitor, electronic device 1200 may only include a subset of the components shown.

Regardless of the specific implementation of electronic device 1200, device 1200 includes a display 1202 and a corresponding display controller 1204. Display 1202 may represent a reflective display in some instances, such as an electronic paper display, a reflective LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of display 1202 that may be used with the implementations described herein include bi-stable LCD displays, cholesteric displays, micro electromechanical system (MEMS) displays, such as interferometric modulator displays, electrophoretic displays, electrofluidic pixel displays, electrowetting displays, photonic ink displays, gyricon displays, and the like. In other implementations, or for other types of devices 1200, display 1202 may be an active display such as a liquid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a liquid in relation to a surface. For instance, by applying a voltage to a hydrophobic surface, the wetting properties of the surface can be modified so that the surface becomes increasingly more wettable. As one example of an electrowetting display, the modification of the surface tension acts as an optical switch by contracting a color oil film (or a non-color oil film with an additional and separate color filter) when a voltage is applied to individual pixels of the display. When the voltage is absent, the color oil forms a continuous film within a pixel, and the color may thus be visible to a user of the display. On the other hand, when the voltage is applied to the pixel, the color oil is displaced by the electrolyte and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

As another example of an electrowetting display, modification of surface tension of a first liquid attracts the electrolyte (e.g., a second liquid) to the modified surface of the first liquid to displace the first liquid (e.g., colored oil). The first liquid can be a black oil which in combination with a color filter can provide a full color display. In the off-state, the black oil forms a continuous film within a pixel, so the pixel is black. In the on-state, the black oil is contracted to reveal the color of an underlying color filter. Alternatively, the black oil can be colored and a color filter need not be necessary to obtain all colors, for example.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, display 1202 may represent a backlit display, examples of which are mentioned above.

In addition to including display 1202, FIG. 12 illustrates that some examples of device 1200 may include a touch sensor component 1206 and a touch controller 1208. In some instances, at least one touch sensor component 1206 resides with, or is stacked on, display 1202 to form a touch-sensitive display (e.g., an electronic paper touch-sensitive display). Thus, display 1202 may be capable of both accepting user touch input and rendering content in response to or corresponding to the touch input. As several examples, touch sensor component 1206 may comprise a capacitive touch sensor, a force sensitive resistance (FSR), an interpolating force sensitive resistance (IFSR) sensor, or any other type of touch sensor. In some instances, touch sensor component 1206 is capable of detecting touches as well as determining an amount of pressure or force of these touches.

FIG. 12 further illustrates that electronic device 1200 may include one or more processors 1210 and one or more computer-readable media 1212, as well as a front light component 1214 (which may alternatively be a backlight component in the case of a backlit display) for lighting display 1202, a cover layer component 1216, such as a cover glass or cover sheet, one or more communication interfaces 1218 and one or more power sources 1220. Communication interfaces 1218 may support both wired and wireless connection to various networks, such as cellular networks, radio, WiFi networks, short range networks (e.g., Bluetooth®), infrared (IR), and so forth.

Depending on the configuration of electronic device 1200, computer-readable media 1212 (and other computer-readable media described throughout) is an example of computer storage media and may include volatile and nonvolatile memory. Thus, computer-readable media 1212 may include, but is not limited to, RAM, ROM, EEPROM, flash memory, or other memory technology, or any other medium that can be used to store computer-readable instructions, programs, applications, media items, and/or data which can be accessed by electronic device 1200.

The computer-readable media 1212 may be used to store any number of functional components that are executable on processor 1210, as well as content items 1222 and applications 1224. For example, computer-readable media 1212 may comprise code executable by processor 1210 to perform process 1100, described above. Thus, computer-readable media 1212 may include an operating system and a storage database to store one or more content items 1222, such as eBooks, audio books, songs, videos, still images, and the like. Computer-readable media 1212 of electronic device 1200 may also store one or more content presentation applications to render content items on device 1200. These content presentation applications may be implemented as various applications 1224 depending upon content items 1222. For instance, the content presentation application may be an electronic book reader application for rending textual electronic books, an audio player for playing audio books or songs, a video player for playing video, and so forth.

As described above, touch sensor component 1206 may comprise a capacitive touch sensor that resides atop display 1202. In some examples, touch sensor component 1206 may be formed on or integrated with cover layer component 1216. In other examples, touch sensor component 1206 may be a separate component in the stack of the display assembly. Front light component 1214 may reside atop or below touch sensor component 1206. In some instances, either touch sensor component 1206 or front light component 1214 is coupled to a top surface of a protective sheet 1226 of display 1202. As one example, front light component 1214 may include a lightguide sheet and a light source (not shown in FIG. 12). The lightguide sheet may comprise a substrate (e.g., a transparent thermoplastic such as PMMA or other acrylic), a layer of lacquer and multiple grating elements formed in the layer of lacquer that function to propagate light from the light source towards display 1202, thus illuminating display 1202.

The cover layer component 1216 may include a transparent substrate or sheet having an outer layer that functions to reduce at least one of glare or reflection of ambient light incident on electronic device 1200. In some instances, the cover layer component 1216 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a $3h$ pencil). Without such scratch resistance, a device may be more easily scratched and a user may perceive the scratches from the light that is dispersed over the top of the reflective display. In some examples, protective sheet 1226 may include a similar UV-cured hard coating on the outer surface. Cover layer component 1216 may couple to another component or to protective sheet 1226 of display 1202. Cover layer component 1216 may, in some instances, also include a UV filter, a UV-absorbing dye, or the like, for protecting components lower in the stack from UV light incident on electronic device 1200. In still other examples, cover layer component 1216 may include a sheet of high-strength glass having an antiglare and/or antireflective coating.

The display 1202 includes protective sheet 1226 overlying an image-displaying component 1228. For example, display 1202 may be preassembled to have protective sheet 1226 as an outer surface on the upper or image-viewing side of display 1202. Accordingly, protective sheet 1226 may be integral with and may overlie image-displaying component 1228. Protective sheet 1226 may be optically transparent to enable a user to view, through protective sheet 1226, an image presented on image-displaying component 1228 of display 1202.

In some examples, protective sheet 1226 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 126 may include a coating, such as the hard coating described above. For instance, the hard coating may be applied to the outer surface of protective sheet 1226 before or after assembly of protective sheet 1226 with image-displaying component 1228 of display 1202. In some examples, the hard coating may include a photoinitiator or other reactive species in its composition, such as for curing the hard coating on protective sheet 1226. Furthermore, in some examples, protective sheet 1226 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by protective sheet 1226, thereby protecting image-displaying component 1228 from UV light.

According to some implementations herein, one or more of the components discussed above may be coupled to display 1202 using LOCA. For example, suppose that the light guide portion of front light component 1214 is to be coupled to display 1202. The light guide may be coupled to display 1202 by placing the LOCA on the outer or upper surface of protective sheet 1226. When the LOCA reaches the corner(s) and/or at least a portion of the perimeter of protective sheet 1226, UV-curing may be performed on the LOCA at the corners and/or the portion of the perimeter. Thereafter, the remaining LOCA may be UV-cured and front light component 1214 may be coupled to the LOCA. By first curing the corner(s) and/or perimeter, the techniques effectively create a barrier for the remaining LOCA and also prevent the formation of air gaps in the LOCA layer, thereby increasing the efficacy of front light component 1214. In other implementations, the LOCA may be placed near a center of protective sheet 1226, and pressed outwards towards a perimeter of the top surface of protective sheet 126 by placing front light component 1214 on top of the LOCA. The LOCA may then be cured by directing UV light through front light component 1214. As discussed above, and as discussed additionally below, various techniques, such as surface treatment of the protective sheet, may be used to prevent discoloration of the LOCA and/or protective sheet 1226.

While FIG. 12 illustrates a few example components, electronic device 1200 may have additional features or functionality. For example, device 1200 may also include additional data storage devices (removable and/or non-removable) such as, for example, magnetic disks, optical disks, or tape. The additional data storage media may include volatile and non-volatile, removable and non-removable media implemented in any method or technology for storage of information, such as computer readable instructions, data structures, program modules, or other data. In addition, some or all of the functionality described as residing within device 1200 may reside remotely from device 1200 in some implementations. In these implementations, device 1200 may utilize communication interfaces 1218 to communicate with and utilize this functionality.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Figure 13:
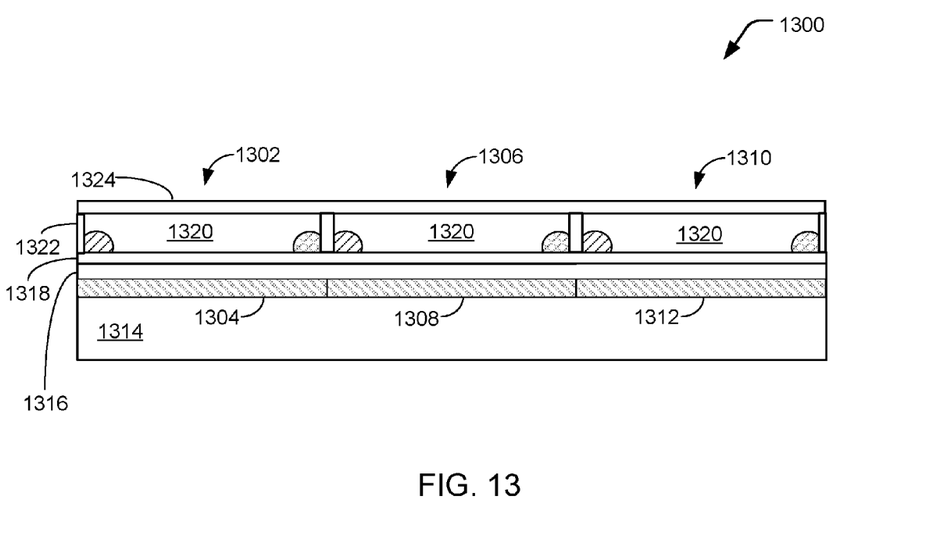
FIG. 13 is a cross-section view showing a pixel of an electrowetting display, according to some embodiments.

FIG. 13 is a cross-section view showing a pixel 1300 of an electrowetting display, according to some embodiments. Pixel 1300 may include subpixels, any of which are the same as or similar to subpixel 100 illustrated in FIG. 1, for example. In a particular embodiment, pixel 1300 may include a red subpixel 1302 that includes a red colored reflector, a green subpixel 1306 that includes a green colored reflector 1308, and a blue subpixel 1310 that includes a blue colored reflector 1312.

Pixel 1300 includes a support plate 1314, the color reflective layers 1304, 1308, and 1312 on support plate 1314, an electrode layer 1316 on the color reflective layers, a hydrophobic layer 1318 on electrode layer 1316, and a liquid region 1320. In some embodiments, liquid region 1320 is at least partially surrounded by pixel walls 1322, hydrophobic layer 1318 and a transparent top support plate 1324.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display comprising:
   pixels on a bottom support plate, wherein each of the pixels includes colored subpixels, the colored subpixels comprising:
      a colored reflective layer on the bottom support plate;
      a bottom electrode on the colored reflective layer;
      a bottom hydrophobic layer on the bottom electrode;
      a liquid region including an electrolyte, wherein the liquid region is at least partially surrounded by i) pixel walls, ii) the bottom hydrophobic layer and iii) a transparent top support plate;
      a dark electrowetting oil immiscible with the electrolyte and disposed adjacent to at least one of the pixel walls in a first portion of the liquid region; and
      a white electrowetting oil immiscible with the electrolyte and disposed adjacent to at least one of the pixels walls in a second portion of the liquid region, wherein a coverage area of the dark electrowetting oil with respect to the colored reflective layer and a coverage area of the white electrowetting oil with respect to the colored reflective layer are electronically adjustable by adjusting the hydrophobicity of the bottom hydrophobic layer to affect light transmission to the colored reflective layer.

2. The electrowetting display of claim 1, wherein the dark electrowetting oil and the white electrowetting oil are in contact with the bottom hydrophobic layer.

3. The electrowetting display of claim 1, further comprising:
   a top electrode on the transparent top support plate; and
   a top hydrophobic layer on the top electrode,
      wherein one of i) the dark electrowetting oil or ii) the white electrowetting oil is in contact with the top hydrophobic layer, and
      wherein the other of i) the dark electrowetting oil or ii) the white electrowetting oil is in contact with the bottom hydrophobic layer.

4. A pixel of an electrowetting display, wherein the pixel includes:
   a colored reflective layer on a bottom support plate; and
   a first colored liquid and a second colored liquid, both in contact with a third substantially clear liquid,
      wherein the first colored liquid and the second colored liquid are immiscible with the third substantially clear liquid, and
      wherein a surface area of the first colored liquid and a surface area of the second colored liquid, with respect to the colored reflective layer, are each controllable by electronically adjusting wettability of (i) the first colored liquid and (ii) the second colored liquid.

5. The pixel of the electrowetting display of claim 4, wherein the first colored liquid and the second colored liquid are immiscible with one another.

6. The pixel of the electrowetting display of claim 4, further comprising:
   an electrode on the colored reflective layer; and
   a hydrophobic layer on the electrode.

7. The pixel of the electrowetting display of claim 6, wherein the first colored liquid and the second colored liquid are both disposed on the hydrophobic layer.

8. The pixel of the electrowetting display of claim 7, wherein
   the first colored liquid is a black electrowetting oil, and
   the pixel renders black when the hydrophobic layer is substantially hydrophobic to the third substantially clear liquid.

9. The pixel of the electrowetting display of claim 7, wherein
   the second colored liquid is a white electrowetting oil, and
   the pixel renders white when the hydrophobic layer is substantially hydrophobic to the third substantially clear liquid.

10. The pixel of the electrowetting display of claim 6, wherein the hydrophobic layer comprises a bottom hydrophobic layer and the electrode comprises a bottom electrode, and further comprising:
    a transparent top support plate covering the third substantially clear liquid;
    a top electrode on the transparent top support plate; and
    a top hydrophobic layer on the top electrode,
       wherein the first colored liquid is disposed on the bottom hydrophobic layer; and
       wherein the second colored liquid is disposed on the top hydrophobic layer.

11. The pixel of the electrowetting display of claim 10, wherein the first colored liquid comprises a white electrowetting oil and the second colored liquid comprises a dark electrowetting oil.

12. The pixel of the electrowetting display of claim 11, wherein the pixel renders black when the top hydrophobic layer is substantially hydrophobic to the third substantially clear liquid.

13. The pixel of the electrowetting display of claim 11, wherein the pixel renders white when the top hydrophobic layer is substantially hydrophilic to the third substantially clear liquid and the bottom hydrophobic layer is substantially hydrophobic to the third substantially clear liquid.

14. The pixel of the electrowetting display of claim 11, wherein a gray state of the pixel occurs when i) the top electrode provides a first voltage to the top hydrophobic layer and ii) the bottom electrode provides a second voltage to the bottom hydrophobic layer so that (i) the top hydrophobic layer and (ii) the bottom hydrophobic layer are partially hydrophilic to the third substantially clear liquid.

15. The pixel of the electrowetting display of claim 11, wherein a colored state of the pixel occurs when i) the top electrode provides a first voltage to the top hydrophobic layer and ii) the bottom electrode provides a second voltage to the bottom hydrophobic layer so that (i) the top hydrophobic layer and (ii) the bottom hydrophobic layer are substantially hydrophilic to the third substantially clear liquid.

16. The pixel of the electrowetting display of claim 4, wherein the third substantially clear liquid comprises an electrolyte including one or more of ethylene glycol, glycerol, or a salt solution.

17. The pixel of the electrowetting display of claim 4, wherein the pixel comprises:
- a red subpixel that includes a red colored reflector,
- a green subpixel that includes a green colored reflector; and
- a blue subpixel that includes a blue colored reflector.

18. A method for operating a pixel of an electrowetting display, the method comprising:
- adjusting (i) voltage or (ii) frequency of a first electronic signal provided to a first electrode adjacent to a hydrophobic layer that overlies a colored reflective layer to vary wettability of a dark liquid on the hydrophobic layer, wherein an amount of light received at the colored reflective layer depends, at least partially, on the wettability of the dark liquid; and
- adjusting (i) voltage or (ii) frequency of a second electronic signal provided to a second electrode adjacent to the hydrophobic layer to vary wettability of a white liquid on the hydrophobic layer, wherein an amount of light received at the colored reflective layer depends, at least partially, on the wettability of the white liquid.

19. The method of claim 18, wherein the colored reflective layer is one of (i) a red reflective layer, (ii) a green reflective layer, or (iii) a blue reflective layer.

20. The method of claim 18, wherein the dark liquid and the white liquid are both in contact with an electrolyte.

21. The method of claim 20, wherein the dark liquid and the white liquid each comprise non-polar electrowetting oils.

* * * * *